United States Patent
Hanumalagutti et al.

(10) Patent No.: US 10,181,765 B2
(45) Date of Patent: Jan. 15, 2019

(54) THERMAL MANAGEMENT ASSEMBLY FOR AN ELECTRIFIED VEHICLE

(71) Applicant: FORD GLOBAL TECHNOLOGIES, LLC, Dearborn, MI (US)

(72) Inventors: Prasad Dev Hanumalagutti, Dearborn, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 15/050,979

(22) Filed: Feb. 23, 2016

(65) Prior Publication Data
US 2017/0244298 A1 Aug. 24, 2017

(51) Int. Cl.
- *H02K 3/24* (2006.01)
- *H02K 9/19* (2006.01)
- *H02K 5/20* (2006.01)
- *B60K 6/26* (2007.10)
- *B60K 6/40* (2007.10)
- *H02K 9/00* (2006.01)

(Continued)

(52) U.S. Cl.
CPC .................. *H02K 5/20* (2013.01); *B60K 6/26* (2013.01); *B60K 6/40* (2013.01); *H02K 3/24* (2013.01); *H02K 9/005* (2013.01); *B60K 1/00* (2013.01); *B60K 11/02* (2013.01); *B60K 2001/006* (2013.01); *B60Y 2200/92* (2013.01); *B60Y 2306/05* (2013.01); *B60Y 2400/604* (2013.01); *H02K 9/19* (2013.01); *Y10S 903/906* (2013.01); *Y10S 903/951* (2013.01)

(58) Field of Classification Search
CPC .. H02K 3/24; H02K 5/20; H02K 1/20; H02K 9/19; H02K 9/005; H02K 9/193; H02K 9/197; H02K 5/02; H02K 3/34; H02K 3/38; H02K 3/46; B60K 6/26; B60K 6/40; B60Y 2200/92; B60Y 2306/05; B60Y 2400/604; Y10S 903/00; Y10S 903/951
USPC ...... 310/60 A, 65, 52–64, 260, 270; 138/38; 165/184
IPC ............... H02K 003/50,003/52, 003/24, 009/19
See application file for complete search history.

(56) References Cited

U.S. PATENT DOCUMENTS 2,961,555 A * 11/1960 Towne ................... H02K 15/12
                                                              310/260
3,109,947 A * 11/1963 Thompson ............. H02K 9/005
                                                              310/260

(Continued)

*Primary Examiner* — Thomas Truong
(74) *Attorney, Agent, or Firm* — David B. Kelley; Brooks Kushman P.C.

(57) ABSTRACT

An electric machine for a vehicle may include a stator, a rotor, and a coolant channel assembly. The stator may include a core defining a cavity and windings disposed within and partially protruding out of the cavity. The rotor may be sized for disposal within the cavity adjacent the windings. The coolant channel assembly may include a channel wound about the partially protruding windings such that the channel and windings are in thermal communication with one another. The coolant channel may define a circular or rectangular cross-section. The coolant channel may define fins therein to induce turbulence into coolant flowing therethrough. The coolant channel and the windings may be arranged such that the coolant channel assembly directly contacts the windings. The coolant channel assembly may be wound such that a portion of the coolant channel assembly is partially disposed between the plurality of base portions.

17 Claims, 4 Drawing Sheets

(51) Int. Cl.
*B60K 1/00* (2006.01)
*B60K 11/02* (2006.01)

(56) References Cited

U.S. PATENT DOCUMENTS

| | | | | |
|---|---|---|---|---|
| 3,662,582 A | * | 5/1972 | French | B21C 37/15 |
| | | | | 165/177 |
| 4,644,210 A | * | 2/1987 | Meisner | H02K 3/24 |
| | | | | 310/211 |
| 6,515,383 B1 | | 2/2003 | Ognibene et al. | |
| 6,713,889 B2 | * | 3/2004 | Dietz | B60K 6/26 |
| | | | | 290/40 C |
| 6,731,028 B2 | | 5/2004 | Derleth et al. | |
| 7,859,146 B2 | | 12/2010 | Robinson et al. | |
| 8,093,770 B1 | | 1/2012 | Berhan | |
| 8,201,621 B2 | * | 6/2012 | Hatman | F01D 5/187 |
| | | | | 138/38 |
| 2002/0079573 A1 | | 6/2002 | Turnbull et al. | |
| 2007/0216236 A1 | * | 9/2007 | Ward | H02K 3/24 |
| | | | | 310/54 |

\* cited by examiner

THERMAL MANAGEMENT ASSEMBLY FOR AN ELECTRIFIED VEHICLE

TECHNICAL FIELD

The present disclosure relates to a thermal management assembly for a portion of an electric machine of an electrified vehicle.

BACKGROUND

Extended drive range technology for electrified vehicles, such as battery electric vehicles ("BEVs") and plug in hybrid vehicles ("PHEVs"), is continuously improving. Achieving these increased ranges, however, often requires traction batteries and electric machines to have higher power outputs and associated thermal management systems to have increased capacities in comparison to previous BEVs and PHEVs.

SUMMARY

An electric machine for a vehicle includes a stator, a rotor, and a coolant channel assembly. The stator includes a core defining a cavity and windings disposed within and partially protruding out of the cavity. The rotor is sized for disposal within the cavity adjacent the windings. The coolant channel assembly includes a channel wound about the partially protruding windings such that the channel and windings are in thermal communication with one another. The coolant channel may define a circular or rectangular cross-section. The coolant channel may define fins therein to induce turbulence into coolant flowing therethrough. The coolant channel and the windings may be arranged such that the coolant channel assembly directly contacts the windings. A material of the coolant channel assembly may be non-metallic such that electro-magnet characteristics of the electric machine are not diminished during operation thereof. The coolant channel assembly may be spaced apart from the stator. The windings may define a plurality of base portions spaced apart from one another. The coolant channel assembly may be wound such that a portion of the coolant channel assembly is partially disposed between the plurality of base portions.

An electric machine assembly for a vehicle includes a stator, a plurality of wires, a rotor, and a coolant channel. The stator defines a cavity. The plurality of wires are disposed about the cavity to create a magnetic field, and each includes a base portion extending from within the cavity and a protruding portion extending from the base portion. The rotor is sized for disposal within the cavity such that a portion of the plurality of wires is between the rotor and stator. The coolant channel is wound about the protruding portion between the base portions, and defines an inlet and outlet. The stator may define a plurality of apertures sized for each base portion of the plurality of wires to extend therethrough. Each of the base portions of the plurality of wires may be spaced apart from one another. The coolant channel may be wound about the protruded portion of the plurality of wires between ninety degrees and one hundred and eighty degrees. An interior surface of the coolant channel may define one or more features to induce turbulence into coolant flowing therethrough. The coolant channel may directly contact the protruding portion of the plurality of wires.

An electrified vehicle includes an electric machine, a traction battery, and a spiral coolant channel. The electric machine includes a stator, rotor, and wires arranged to generate electrical energy or mechanical energy. The traction battery is electrically connected to the electric machine. The spiral coolant channel continuously wraps around a portion of end windings of the wires external to the stator, and defines an inlet and outlet at opposite ends of the spiral coolant channel. The stator may define a plurality of apertures for base portions of the wires to extend therethrough such that end windings of the wires are spaced apart from the stator. The spiral coolant channel may extend between the base portions of the wires. The spiral coolant channel may define a circular or rectangular cross-section. An interior surface of the spiral coolant channel may define one or more fins to induce turbulence into coolant flowing therethrough. The spiral coolant channel may directly contact the portion of end windings of the wires external to the stator. The inlet and outlet may be located adjacent one another.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
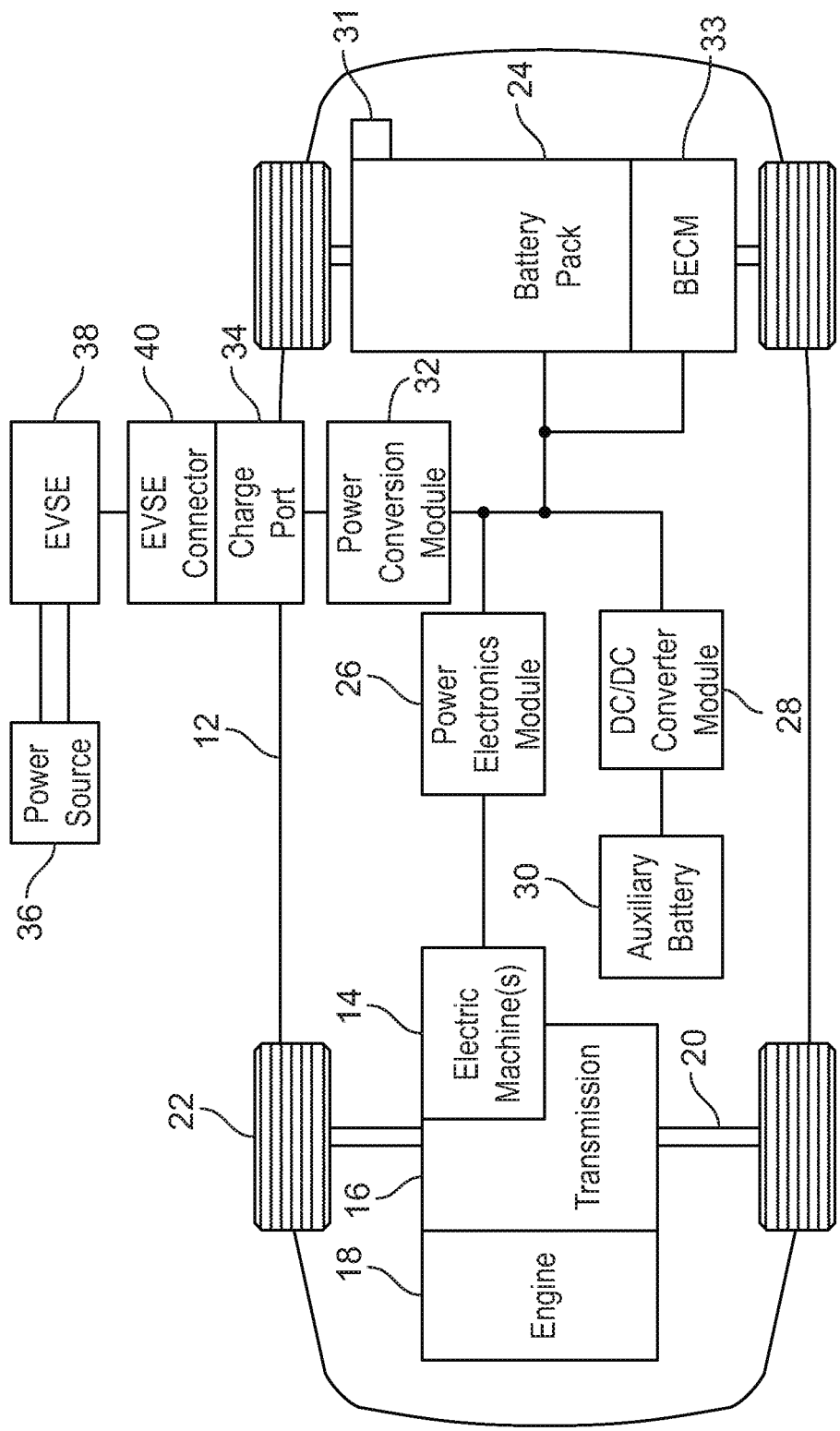
FIG. 1 is a schematic diagram illustrating an example of an electrified vehicle.

FIG. 1 depicts a schematic of an example of a PHEV, referred to as a vehicle 12 herein. The vehicle 12 may comprise one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 may also act as generators and may provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that may be used by the electric machines 14. The traction battery 24 may provide a high voltage DC output from one or more battery cell arrays, sometimes referred to as battery cell stacks, within the traction battery 24. The battery cell arrays may include one or more battery cells. The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may also be electrically connected to the electric machines 14 and provides the ability to bi-directionally transfer electrical energy between the traction battery 24 and the electric machines 14. For example, the traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A DC/DC converter module 28 may convert high voltage DC output of the traction battery 24 to a low voltage DC supply that is compatible with other vehicle loads. Other high-voltage loads, such as compressors and electric heaters, may be connected directly to the high-voltage without the use of the DC/DC converter module 28. The low-voltage systems may be electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electrified vehicle which includes components for a PHEV, a FHEV, a MHEV, or a BEV. The traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

Current examples of thermal management assemblies for electric machines may introduce oil to portions of the electric machine for cooling purposes. The oil may be dripped or sprayed onto wire end windings of the electric machine. However, this practice may not be very effective in cooling the end windings due to a non-uniformity of coolant flow. An air cooled thermal management assembly is another example of an assembly to assist in managing thermal conditions of an electric machine. In this example, a fan or blower may be located adjacent the end windings to push air thereto for cooling purposes.

Figure 2:
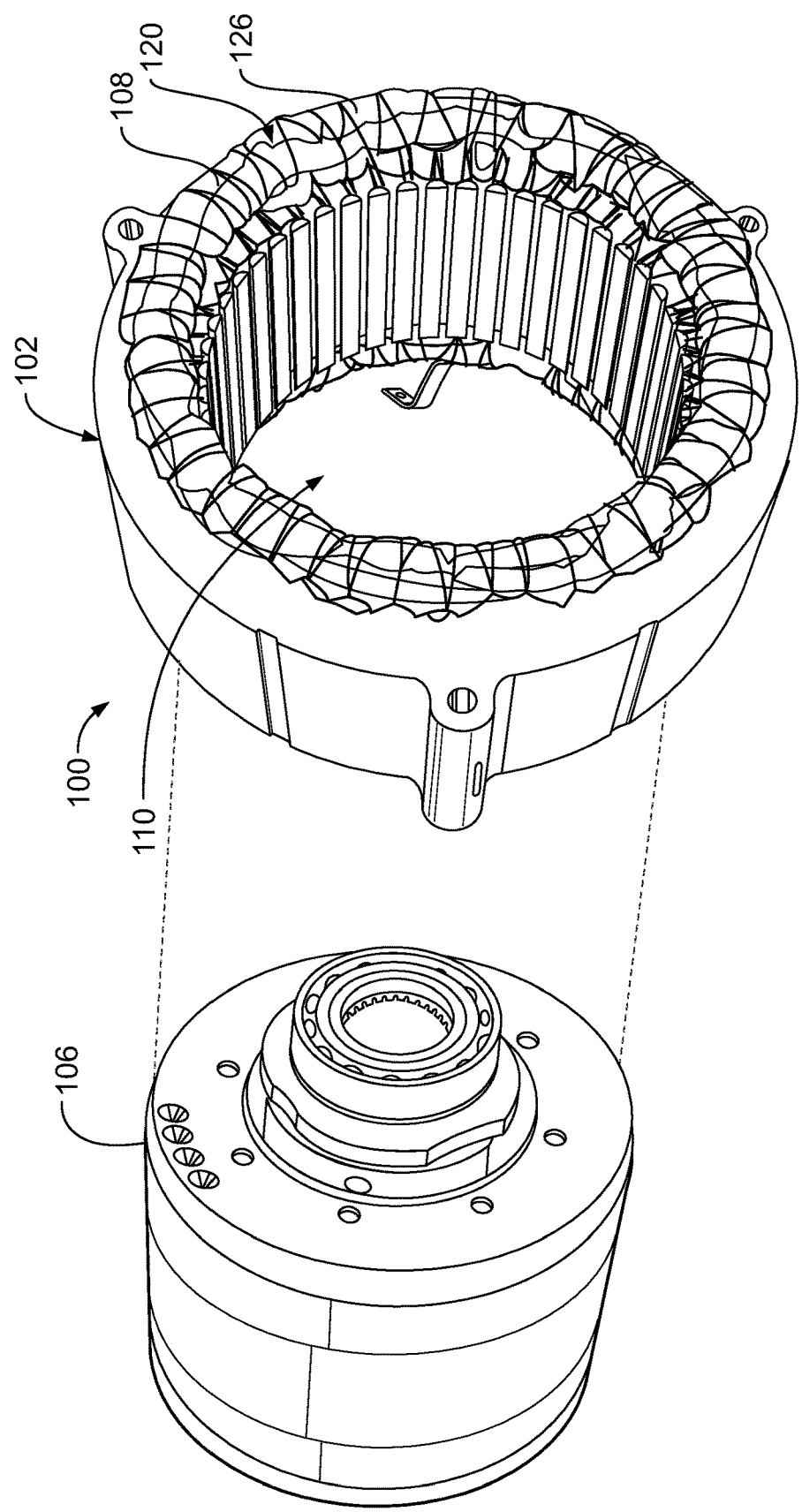
FIG. 2 is a perspective view of an example of an electric machine.

FIG. 2 shows an example of an electric machine for an electrified vehicle, referred to generally as an electric machine 100 herein. The electric machine 100 may include a stator core 102 and a rotor 106. Electrified vehicles may include two electric machines. One of the electric machines may function primarily as a motor and the other may function primarily as a generator. The motor may operate to convert electricity to mechanical power and the generator may operate to convert mechanical power to electricity. The stator core 102 may define an inner surface 108 and a cavity 110. The rotor 106 may be sized for disposal and operation within the cavity 110. A shaft (not shown) may be operably connected to the rotor 106 to drive rotation thereof.

Windings 120 may be disposed within the cavity 110 of the stator core 102. In an electric machine motor example, current may be fed to the windings 120 to obtain a rotation force on the rotor 106. In an electric machine generator example, current generated in the windings 120 by a rotation of the rotor 106 may be removed to power vehicle components. Portions of the windings 120, referred to as end windings 126 herein, may protrude from the cavity 110. During operation of the electric machine 100, heat may be generated along the windings 120 and end windings 126.

Figure 4:
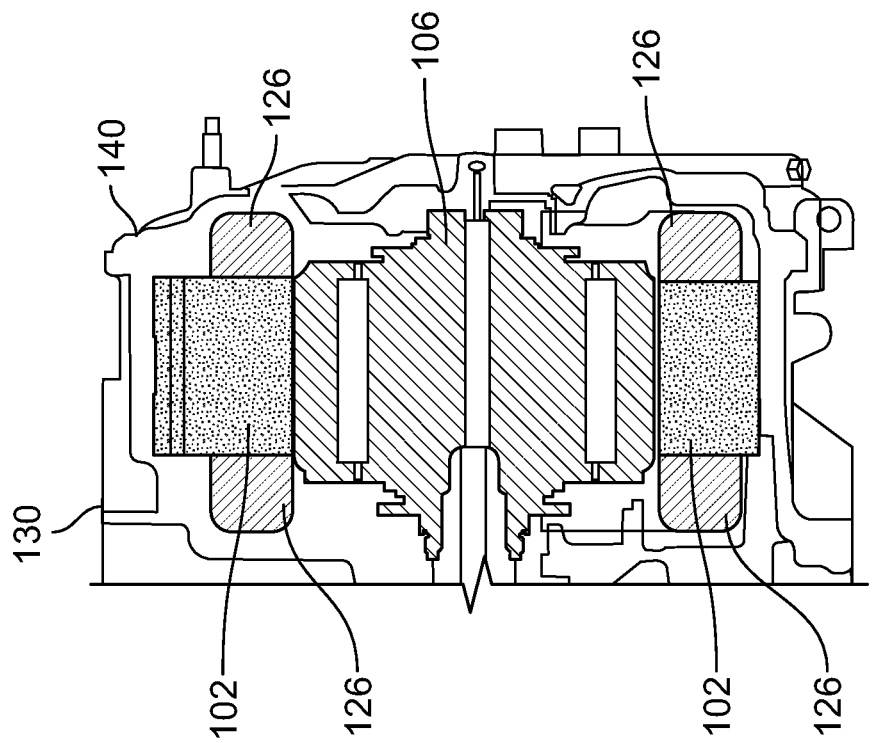
FIG. 4 is a side view, in cross-section, of a portion of the electric machine of FIG. 3.
Figure 3:
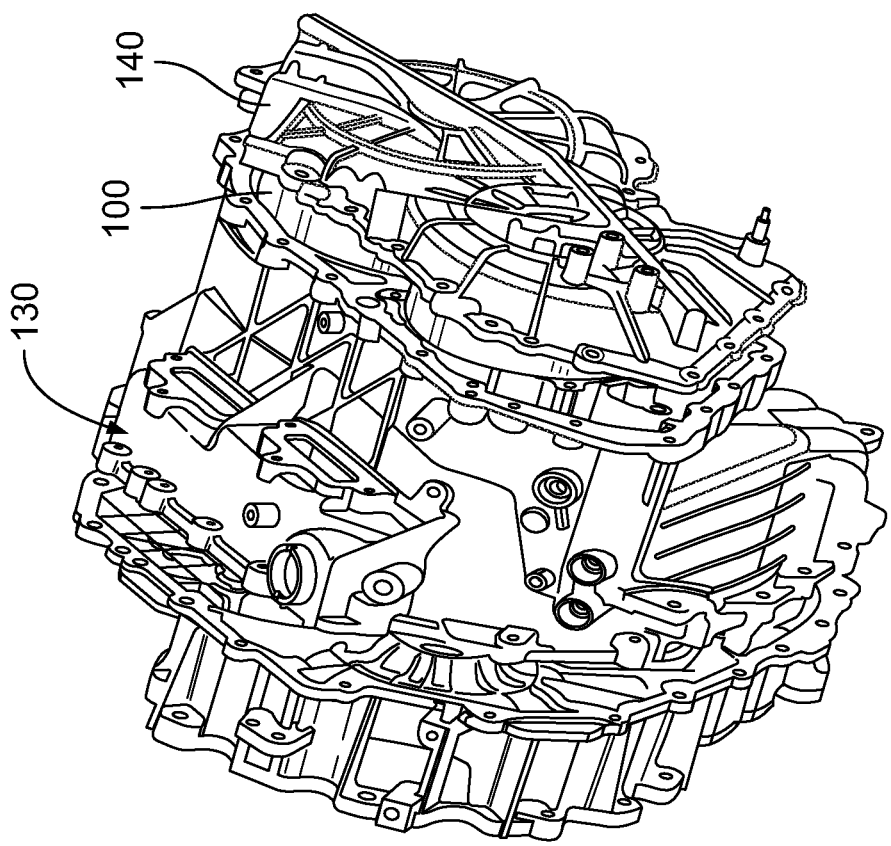
FIG. 3 is a perspective view of a housing for an electric machine, such as the electric machine of FIG. 2.

FIG. 3 shows an example of a housing to retain vehicle components, referred to as a housing 130 herein. Examples of vehicle components which may be retained within the housing 130 include the electric machine 100 or a vehicle transmission. A cover 140 may be secured to the housing 130. FIG. 4 shows a cross-sectional view of a portion of FIG. 3. The cover 140 may be arranged with the stator core 102 such that a cavity is defined by the cover 140 to receive the end windings 126 extending from the stator core 203. For example, the cavity defined by the cover 140 may be sized such that end windings 126 protruding from the stator core 102 may be disposed therein.

Figures 5, 6, 7, 8, 9:
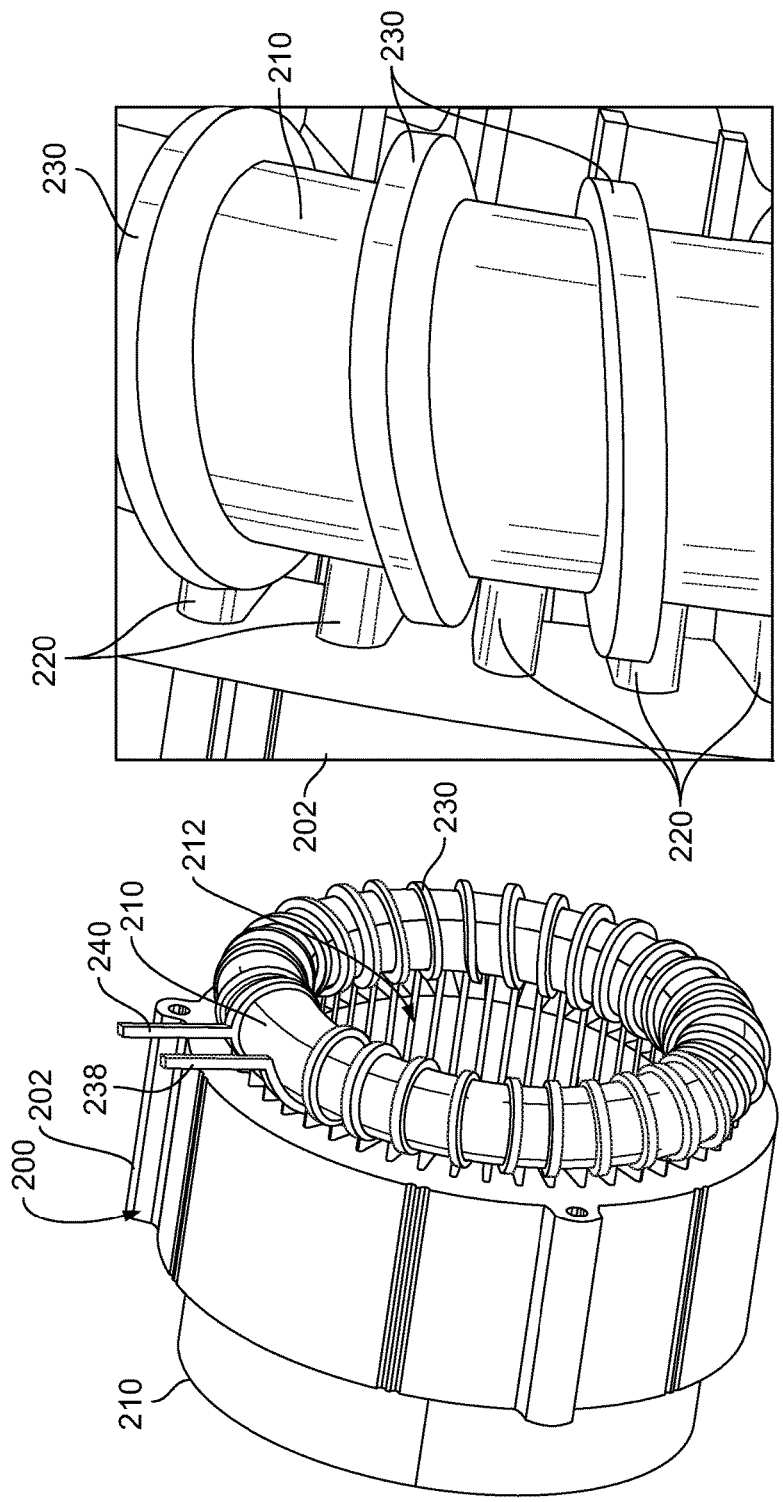
FIG. 5 is a perspective view of an example of a portion of an electric machine including a portion of a thermal management assembly.
FIG. 6 is a detailed view of the portion of the thermal management assembly of FIG. 5.
FIG. 7 is a front view, in cross-section, of a portion of the thermal management assembly of FIG. 5.
FIG. 8 is a front view, in cross-section, of an example of a coolant channel for a thermal management assembly of an electric machine.
FIG. 9 is a front view, in cross-section, of an example of a coolant channel for a thermal management assembly of an electric machine.

FIG. 5 shows an example of a portion an electric machine, referred to generally as an electric machine 200 herein. A rotor is not shown in FIG. 5 so that other components may be seen more clearly. The electric machine may include a stator 202 and end windings 210. The stator 202 may define a cavity 212 therein. The end windings 210 may be disposed within the cavity 212 and protrude therefrom on both sides of the stator 202. For example, the stator 202 may define apertures for a base portion 220 of the end windings 210 to extend therethrough. The apertures may be spaced apart from one another to influence a spacing of the base portions 220 of the end windings 210.

The base portions 220 may be sized such that the end windings 210 are spaced away from the stator 202. The end windings 210 may extend three hundred and sixty degrees about the stator 202. A coolant channel assembly may be wound about the end windings 210 for coolant to flow therethrough. The coolant may assist in managing thermal conditions of the end windings 210 during operation. For example, the coolant channel assembly may include a coolant channel 230. The coolant channel 230 may extend continuously about the end windings 210 in a spiral fashion. The coolant channel 230 may be in direct contact with the end windings 210 or may be spaced apart therefrom. The coolant channel 230 may be of a non-metallic material such that electro-magnet characteristics of the electric machine 200 are not diminished during operation thereof. The coolant channel 230 may be wound about the end windings 210 at various degrees based on packaging space and desired performance. For example, the coolant channel 230 may be partially wrapped about the end windings 210 at, for example, ninety degrees to one hundred and eighty degrees.

The base portions 220 may be spaced apart from one another to provide space for a portion of the coolant channel 230. For example, portions of the coolant channel 230 may extend between the base portions 220 of the end windings 210 as shown in more detail in FIG. 6. The coolant channel 230 may include an inlet 238 and an outlet 240 to assist in receiving and removing coolant from the coolant channel 230. The inlet 238 and the outlet 240 may be located adjacent one another or may be spaced apart based upon a degree in which the coolant channel 230 wraps about the end windings 210. A size and shape of the coolant channel 230 may define various configurations according to packaging space and desired performance.

FIGS. 7 through 9 show examples of cross-sections which may be defined by a coolant channel, such as the coolant channel 230, as described above. For example, FIG. 7 shows the coolant channel 230 in cross-section. In this example, the coolant channel 230 defines a substantially rectangular shape. An interior surface of the coolant channel 230 may define features to assist in influencing turbulence of coolant flowing therethrough. For example, fins 242 may be defined by the interior surface of the coolant channel 230. The fins 242 may define various shapes and may be located at various positions within the coolant channel 230. FIG. 8 shows an example of a coolant channel 260 which may define a substantially circular shape. FIG. 9 shows an example of a coolant channel 264 which may define a substantially triangular shape.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle electric machine comprising:
    a stator including a core defining a cavity, and windings partially protruding out of the cavity;
    a rotor disposed within the cavity adjacent the windings; and
    a coolant channel wrapped from a radially outer winding surface to a radially inward winding surface in a spiral configuration and extending through an opening defined between adjacent base portions of the windings and being spaced from the stator.

2. The electric machine of claim 1, wherein the channel defines a circular or rectangular cross-section.

3. The electric machine of claim 1, wherein the channel defines fins therein to induce turbulence into coolant flowing therethrough.

4. The electric machine of claim 1, wherein the coolant channel and the windings are arranged such that the channel directly contacts a portion of the windings not contacting the stator.

5. The electric machine of claim 1, wherein a material of the channel is non-metallic such that electro-magnet characteristics of the electric machine are not diminished during operation thereof.

6. An electric machine assembly for a vehicle comprising:
    a stator defining a cavity;
    a plurality of wires disposed about the cavity to generate a magnetic field, and each including a base portion extending from within the cavity and an external portion extending from the base portion and not in contact with the stator;
    a rotor disposed within the cavity such that a portion of the plurality of wires is between the rotor and stator; and
    a coolant channel wrapped from a radially outer winding surface to a radially inward winding surface in a spiral configuration and extending through an opening defined between adjacent base portions of the wires and not contacting the stator, and defining an inlet and an outlet.

7. The assembly of claim 6, wherein the stator defines a plurality of apertures sized for each base portion of the plurality of wires to extend therethrough.

8. The assembly of claim 6, wherein each of the base portions of the plurality of wires are spaced apart from one another.

9. The assembly of claim 6, wherein the coolant channel is wound about the external portion of the plurality of wires between ninety degrees and one hundred and eighty degrees.

10. The assembly of claim 6, wherein an interior surface of the coolant channel defines one or more features to induce turbulence into coolant flowing therethrough.

11. The assembly of claim 6, wherein the coolant channel directly contacts the external portion of the plurality of wires.

12. An electrified vehicle comprising:
   an electric machine including a stator, a rotor, and wires arranged to generate electrical energy or mechanical energy;
   a traction battery electrically connected to the electric machine; and
   a spiral coolant channel continuously wrapped from a radially outer winding surface to a radially inward winding surface of an upper portion of end windings of the wires external to the stator in a spiral configuration, wherein the spiral coolant channel extends through openings defined between adjacent base portions of the end windings of the wires, does not contact the stator, and defines an inlet and outlet at opposite ends of the spiral coolant channel.

13. The vehicle of claim 12, wherein the stator defines a plurality of apertures for the base portions of the wires to extend therethrough such that the upper portion of the end windings are spaced apart from the stator.

14. The vehicle of claim 12, wherein the spiral coolant channel defines one of a circular or a rectangular cross-section.

15. The vehicle of claim 12, wherein an interior surface of the spiral coolant channel defines one or more fins to induce turbulence into coolant flowing therethrough.

16. The vehicle of claim 12, wherein the spiral coolant channel directly contacts the upper portion of the end windings of the wires external to the stator.

17. The vehicle of claim 12, wherein the inlet and outlet are located adjacent one another.

* * * * *